United States Patent [19]

Blum

[11] 3,864,486

[45] Feb. 4, 1975

[54] THERAPEUTIC COMPOSITIONS OF BROMAZEPAM AND SULPIRIDE

[75] Inventor: Johannes Ernst Blum, Basel, Switzerland

[73] Assignee: F. Hoffmann La Roche & Co. Aktiengesellschaft, Basel, Switzerland

[22] Filed: Sept. 12, 1973

[21] Appl. No.: 396,651

[30] Foreign Application Priority Data
Sept. 21, 1972  Switzerland...................... 13805/72

[52] U.S. Cl................................ 424/244, 424/274
[51] Int. Cl............................................ A61k 27/00
[58] Field of Search............................ 424/244, 274

[56] References Cited
FOREIGN PATENTS OR APPLICATIONS
6833    5/1969   France 6834    5/1969   France

OTHER PUBLICATIONS

Chem. Abst. 7th Coll., Subject Index, p. 2994S, Am-n–Be.

Chem. Abst. 8th Coll., Subject Index, p. 4045S, Benzimidazolin–By.

*Primary Examiner*—Stanley J. Friedman
*Attorney, Agent, or Firm*—Samuel L. Welt; Jon S. Saxe; R. Hain Swope

[57]            ABSTRACT

Compositions possessing anxiolytic, antipsychotic, antidepressant and antiemetic activity and containing, as the active ingredient, a combination of bromazepam and sulpiride or their pharmaceutically acceptable salts are described.

3 Claims, No Drawings

THERAPEUTIC COMPOSITIONS OF BROMAZEPAM AND SULPIRIDE

BACKGROUND OF THE INVENTION

Bromazepam is a known compound possessing pronounced muscle-relaxant, anticonvulsant, sedative and anti-aggressive properties. Chemically, bromazepam is 7-bromo-1,3-dihydro-5-(2-pyridyl)-2H-1,4-benzodiazepin-2-one. Sulpiride is also a known compound possessing antiemetic and antipsychotic activity without sedative activity and possessing cataleptic activity only in high dosage. Chemically, sulpiride is N-[(1-ethyl-2-pyrrolidinyl) methyl]-2-methoxy-5-sulfamoylbenzamide.

Compositions of sulpiride and other therapeutic agents are known to the art. French Medical Pat. Nos. 6,833M and 6,834M published May 12, 1969 pertain to sulpiride in combination with diazepam and amitriptyline, respectively. In regard to the combination of sulpiride and diazepan, French Medical Pat. No. 6,833 M states that it is effective in therapeutic situations where diazepam therapy had not been successful and so the activity of diazepam is stated as being "potentiated." French Medical Pat. No. 6,834M states that the antidepressant activity of amitriptyline is "potentiated" in combination with sulpiride and also that the incidence of "l'inversion thymique," classified as a secondary effect of long term therapy with amitriptyline, is materially reduced or eliminated by combining it with sulpiride.

The compositions of the present invention have been found to possess a spectrum of activity which is considered to be unexpected in view of the therapeutic activities of either component of the active ingredient thereof. Specifically, the compositions of the present invention have been found to possess a broad spectrum of anxiolytic, antipsychotic, antidepressant and antiemetic activity substantially without the sedative activity which is a characteristic activity of bromazepam.

BRIEF SUMMARY OF THE INVENTION

Therapeutically active compositions possessing anxiolytic, antipsychotic, antidepressant and antiemetic activity and comprising, as the active ingredient, a combination of bromazepam and sulpiride or their pharmaceutically acceptable salts thereof.

DETAILED DESCRIPTION OF THE INVENTION

The therapeutic compositions of the invention comprise, as the active ingredient, a combination of bromzepam or a pharmaceutically acceptable salt thereof and sulpiride or a pharmaceutically acceptable salt thereof, and a pharmaceutically acceptable, therapeutically inert carrier therefor. More specifically, the active ingredient of the compositions of the invention comprises for each part by weight of bromazepam or the equivalent amount of a pharmaceutically acceptable salt thereof from about 5 to about 200 parts by weight, preferably from about 20 to about 100 parts by weight, most preferably from about 25 to about 50 parts by weight of sulpiride or the equivalent amount of a pharmaceutically acceptable salt thereof.

As utilized herein, the expression "pharmaceutically acceptable salt" indicates salts of each of bromazepam and sulpiride with pharmaceutically acceptable organic and inorganic acids. Examples of suitable salts formed with inorganic acids include the hydrochloride, the hydrobromide, the phosphate and the like and salts from organic acids include the p-toluene-sulfonate, the methylsulfonate and the like. The preferred salt for both bromazepam and sulpiride is the hydrochloride.

The compositions of the present invention are prepared by admixing bromazepam or a pharmaceutically acceptable salt thereof and sulpiride or a pharmaceutically acceptable salt thereof. This mixture is ultimately bodied into a suitable enteral or parenteral dosage form. For example, the compositions of the invention can be compressed by conventional methods into tablets or filled into hard shell capsules. Further, the composition may also be enterally administered in the form of suppositories, solutions, syrups, suspensions and the like. In addition, the composition of the invention can be formulated into suitable dosage forms for parenteral administration which are prepared by methods well known in the art.

In addition to the active ingredient which comprises the combination of bromazepam and sulpiride or their pharmaceutically acceptable salts, the compositions of this invention can contain as optional ingredients any of the various adjuvants which are ordinarily utilized in the production of pharmaceutical preparations. Thus, for example, in formulating dosage forms for oral administration, one may use as optional ingredients: fillers such as coprecipitated aluminum hydroxide-calcium carbonate, calcium phosphate dibasic, mannitol, lactose and the like; disintegrating agents such as maize starch, cellulose and the like; pharmaceutical tabletting lubricants such as talc, calcium stearate, magnesium stearate or the like; and acidifying agents which act to stabilize the preparations such as edible organic acids, for example, citric acid, tartaric acid and the like. Further, in forming liquid dosage forms of the compositions of the invention one may utilize conventional pharmaceutical adjuvants and carrier materials recognized as being conventional for preparation of such dosage forms such as, for example, water, sugar solutions, vegetable oils such as arachis oil and the like. The preparations of the invention may also contain other optional ingredients which are conventional in the art of pharmaceutical compounding such as suspending agents, sweeteners, preservatives, stabilizers, flavoring agents and the like. Such preparations may also be admitted to pharmaceutical expedients such as, for example, sterilization and the like.

The novel therapeutic compositions of the present invention are particularly advantageous in that their spectrum of activity is broader than would be expected from a consideration of the activities of the individual components of the active ingredient. The compositions of the invention are additionally advantageous in that they exhibit only slight sedative activity. The fact that the compositions of the invention have only very mild sedative activity is considered to be advantageous in that sedation is considered undesirable in many instances where anxiolytic, antipsychotic, antidepressant and antiemetic therapy is indicated. The compositions of the present invention are useful in the treatment of psychosomatic disturbances, psychoneuroses and certain forms of schizophrenia. The compositions of the invention may also be utilized therapeutically for their antiemetic activity.

A preferred oral dosage unit containing the combination of this invention, e.g., tablet or capsule, contains about 2 mg. to about 6 mg. bromazepam or the equivalent amount of a pharmaceutically acceptable salt thereof and from about 50 mg. to about 200 mg. of sulpiride or the equivalent amount of a pharmaceutically acceptable salt thereof. Such dosage units are intended for administration to adults in most clinical situations where anxiolytic, antipsychotic, antidepressant and antiemetic therapy is indicated, a daily dosage of from about 2 mg to about 16 mg of bromazepam and of from about 50 mg to about 800 mg of sulpiride being preferred but it will be appreciated that smaller dosages may be administered in the case of children or older or debilitated patients and larger dosages may be administered if warranted by the severity of the therapeutic situation. The particular dosage regimen to be utilized in a given therapeutic situation is considered to be within the skill of the clinician.

The following experiment demonstrates the fact that, unexpectedly, the sedative/muscle relaxant activity of bromazepam is considerably reduced by the presence of sulpiride in the compositions of the invention.

In this test, mice selected for their ability to remain for 2 minutes on a rod 30 mm. in diameter and rotating at 16 revolutions per minute were dosed per os with test compound(s), eight mice being utilized per dose. Thirty minutes after administration of test compound, the mice were again placed in the rod and observed for two minutes to determine their ability to remain on the rod. Those mice failing to remain on the rod were judged to be affected by the test compound(s). The results of this experiment are given in Table I in terms of the reduction in time on the rod as a percent versus control which is 100%.

Table I

| Test Compound | mg/kg p.o. | Percent Reduction in Time on Rod |
|---|---|---|
| Bromazepam | 0.4 | 53 ± 5 |
| Bromazepam + sulpiride | 0.4 10 | 19 ± 2.6 |
| Bromazepam + sulpiride | 0.4 30 | 20 ± 5 |
| Bromazepam + sulpiride | 0.4 100 | 15 ± 0.8 |
| Bromazepam + sulpiride | 0.4 300 | 21 ± 10 |
| Bromazepam + sulpiride | 0.4 1000 | 16 ± 2.5 |

The results of this experiment demonstrate that the sedative/muscle relaxant activity of bromazepam is sharply reduced by combining it with sulpiride in accordance with the present invention.

The following experiment demonstrates the fact that the anticonvulsant activity of bromazepam is substantially undiminished in the combinations of the present invention.

In this experiment, groups of 10 mice were dosed per os with test compound(s) and, after 30 minutes, pentetrazole was given as a 0.5% solution via infusion into the tail vein. The mice were observed until convulsant activity was evidenced by maximum tonic stretching of the hind extremeties. The results of this experiment are given in Table II in terms of a pentetrazole ratio. This ratio is determined by dividing the amount of pentetrazole in mg./kg. required to produce convulsions in the presence of (a) test compound(s) by the amount required in control animals receiving no test compound(s). A ratio of two or greater is considered to be indicative of anticonvulsant activity.

Table II

| Test Compound | mg./kg. p.o. | Pentetrazole Ratio |
|---|---|---|
| Bromazepam | 1.4 | 2.58 ± 0.13 |
| Bromazepam + sulpiride | 1.4 10 | 2.18 ± 0.08 |
| Bromazepam + sulpiride | 1.4 30 | 2.25 ± 0.16 |
| Bromazepam + sulpiride | 1.4 100 | 2.53 ± 0.14 |

As is readily apparent from the results in Table II, the anticonvulsant activity of bromazepam is substantially retained in the combination of the present invention.

EXAMPLE 1

A solution to be packaged in 1 ml. containers having a calibrated dropper was prepared from the following formulation:

| Ingredient | Quantity |
|---|---|
| Bromazepam | 3.0 mg. |
| Sulpiride | 50.0 mg. |
| Saccharin sodium | 5.0 mg. |
| Ethylenediamine tetraacetic acid disodium salt | 0.1 mg. |
| Pharmaceutical colors | 1.2 mg. |
| Pharmaceutical aromatics | q.s. |
| Propyleneglycol | q.s. ad 1 ml. |

The saccharin sodium, ethylenediaminetetraacetic acid, disodium salt and pharmaceutical coloring agents were dissolved in propyleneglycol at 70°C. The resulting solution was cooled to 40°C. and the bromazepam and sulpiride dissolved therein. The resulting solution was cooled to room temperature. The aromatics were added and the final volume adjusted with propyleneglycol.

A second solution was prepared utilizing 12 mg. bromazepam with all other quantities remaining the same.

EXAMPLE 2

Parenteral preparations to be dispensed in duplex ampoules were prepared from the following formulation:

| Ampoule A - Active Ingredient | |
|---|---|
| Ingredient | Amount |
| Bromazepam | 3.0 mg. |
| Sulpiride | 50.0 mg. |
| Sulfuric acid (d = 1.83) | 7.2 mg. |
| Absolute alcohol | 500.0 μl. |
| Benzyl alcohol | 100.0 mg. |
| Propyleneglycol | q.s. ad 2.5 ml. |
| Ampoule B — Diluent | |
| Methyl p-hydroxybenzoate | 2.0 mg. |
| Propyl p-hydroxybenzoate | 0.25 mg. |
| Water for Injection | q.s. ad 2.5 ml. |

The solid ingredients and the sulfuric acid in the Ampoule A formulation were dissolved in the benzyl alcohol and propylene glycol with slight warming. The solution was cooled to room temperature, the absolute alcohol added and the solution adjusted to final volume with propylene glycol. The solution was then filled into 5 ml. ampoules. The two solids in the diluent formulation were dissolved with strong heating in the water for injection. The diluent was filled into 3 ml. ampoules. The ampoules were then sterilized by conventional procedures.

Ampoules were prepared in the above manner utilizing 12 mg. of bromazepam with all other quantities remaining constant.

Example 3

Tablets having the following composition per tablet:

| Ingredient | Amount in mg. |
|---|---|
| Bromazepam | 6.0 |
| Sulpiride | 50.0 |
| Lactose, spray dried | 80.0 |
| Maize starch | 44.0 |
| Kollidon[1] | 14.0 |
| Talc | 5.4 |
| Magnesium Stearate | 0.6 |
| Total | 200.0 mg. |

[1]Kollidon is polyvinylpyrrolidone furnished by Badische Anilin- und Sodafabrik, Ludwigshafen, Germany The bromazepam, sulpiride, lactose and about 80% of the maize starch were mixed until homogeneous and wet granulated with the Collidon as a 10% by weight aqueous solution. The resulting granulation was comminuted, combined with the remainder of the maize starch, talc and magnesium stearate, blended until homogeneous and compressed into tablets on conventional equipment. Each such tablet weighed 200 mg.

EXAMPLE 4

The following formulation was blended until homogeneous and compressed directly into tablets weighing 300 mg.

| Ingredient | Amount in mg. |
|---|---|
| Bromazepam | 12.0 |
| Sulpiride | 50.0 |
| Lactose | 80.0 |
| Microcrystalline Cellulose | 155.0 |
| Magnesium Stearate | 3.0 |
| Total | 300.0 |

EXAMPLE 5

The following formulation was mixed until homogeneous and filled into gelatin capsules:

| Ingredient | Amount in mg. |
|---|---|
| Bromazepam | 3.0 |
| Sulpiride | 50.0 |
| Lactose | 172.0 |
| Maize starch | 35.0 |
| Talc | 18.0 |
| Magnesium Stearate | 2.0 |
| Total | 280.0 |

I claim:

1. A therapeutic composition possessing anxiolytic, antipsychotic, antidepressant and antiemetic activity comprising a therapeutically inert, pharmaceutically acceptable carrier material and, as an active ingredient, one part by weight bromazepam or the equivalent amount of a pharmaceutically acceptable salt thereof and from about 5 to about 200 parts by weight sulpiride or the equivalent amount of a pharmaceutically acceptable salt thereof.

2. The composition of claim 1 wherein for each part by weight of bromazepam or the equivalent amount of a pharmaceutically acceptable salt thereof, there is present from about 20 to about 100 parts by weight of sulpiride or the equivalent amount of a pharmaceutically acceptable salt thereof.

3. The composition of claim 1 in unit dosage form suitable for enteral administration each such unit dosage form containing from about 2 mg. to about 6 mg. of bromazepam or the equivalent amount of a pharmaceutically acceptable salt thereof and from about 50 mg. to about 200 mg. sulpiride or the equivalent amount of a pharmaceutically acceptable salt thereof.

* * * * *